US008726799B2

(12) United States Patent
Prommel et al.

(10) Patent No.: US 8,726,799 B2
(45) Date of Patent: May 20, 2014

(54) AVOCADO PITTING DEVICE

(75) Inventors: Mark Prommel, Brooklyn, NY (US);
Todd Brunner, Brooklyn, NY (US);
Kevin O'Leary, Brooklyn, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 139 days.

(21) Appl. No.: 13/215,807

(22) Filed: Aug. 23, 2011

(65) Prior Publication Data
US 2013/0047865 A1     Feb. 28, 2013

(51) Int. Cl.
*A47J 23/00*     (2006.01)
*A23N 7/08*      (2006.01)
*B26B 3/00*      (2006.01)

(52) U.S. Cl.
USPC ................ 99/538; 99/542; 30/303

(58) Field of Classification Search
USPC ............ 99/542, 551, 552, 547; 30/114, 302, 30/303, 316, 113.1–113.3; 83/856, 857, 83/569
See application file for complete search history.

(56) References Cited

U.S. PATENT DOCUMENTS

| | | | |
|---|---|---|---|
| 1,629,131 A | | 5/1927 | Sullivan |
| 2,505,917 A | * | 5/1950 | Schumacher ............... 30/113.3 |
| 4,197,611 A | | 4/1980 | Bell et al. |
| 4,629,629 A | * | 12/1986 | David ............................ 426/482 |
| 5,115,565 A | * | 5/1992 | Narlock et al. ............... 30/123.6 |
| 5,557,998 A | * | 9/1996 | Schwartz et al. ............... 83/875 |
| 5,613,431 A | * | 3/1997 | Tateno ............................ 99/541 |
| D394,372 S | * | 5/1998 | Chang ............................ D7/693 |
| 7,055,247 B2 | | 6/2006 | Kaposi et al. |
| 7,080,454 B2 | | 7/2006 | Holcomb et al. |
| 7,086,155 B2 | * | 8/2006 | Chan et al. ...................... 30/114 |
| 7,114,258 B2 | * | 10/2006 | Miller .......................... 30/113.2 |
| 7,421,786 B2 | * | 9/2008 | Dorion et al. ................... 30/114 |
| D682,632 S | * | 5/2013 | Krus .............................. D7/693 |
| 2008/0047149 A1 | | 2/2008 | Webb |
| 2009/0249965 A1 | | 10/2009 | Hauser |

OTHER PUBLICATIONS

Internet web page http://www.amazon.com/Progressive-International-GT-3654-Avocado-Slicer/dp/B0000DD . . . printed on Aug. 23, 2011.
Internet web page http://www.chefn.com/Product.aspx?id=54 printed on Aug. 23, 2011.
Internet web page http://www.foodnetworkstore.com/p-472138-Avocado-Slicer-and-Pitter.aspx printed on Aug. 23, 2011.
Internet web page http://www.amazon.com/Norpro-Stainless-Steel-Avocado-Slicer/dp/B000SSX28G printed on Aug. 23, 2011.
Internet web page http://www.amazon.com/Tovolo-90/3268-STANDZ-Avocado-Slicer/dp/B0036DD9RO printed on Aug. 23, 2011.
Internet web page http://www.chefsresource.com/amco-guacamole-masher.html printed on Aug. 23, 2011.
Internet web page http://www.walmart.com/ip/Pyrex-Avocado-Slicer/15065013 printed on Aug. 23, 2011.

(Continued)

*Primary Examiner* — Dana Ross
*Assistant Examiner* — Renee L Miller
(74) *Attorney, Agent, or Firm* — Rankin, Hill & Clark LLP

(57) ABSTRACT

An avocado pitting device comprises a housing having an inner surface defining a recess. The recess is configured to receive a pit of an avocado. An engagement member projects inwardly from the housing inner surface. The engagement member is configured to engage the pit and retain the pit within the recess such that the pit is removable with the housing from the avocado.

19 Claims, 5 Drawing Sheets

(56) References Cited

OTHER PUBLICATIONS

Internet web page http://www.sears.com/jokari-healthy-steps-avocado-pro/p-SPM3443664701P printed on Aug. 23, 2011.

Internet web page http://www.zylissusa.com/cgi-bin/v1/index.cgi?main+987654323&sub1=539000013⊂ . . . printed on Aug. 23, 2011.

Internet web page http://www.shopinthekitchen.com/store/product/10484/TRUDEAU%26%230153%3b-AV . . . printed on Aug. 23, 2011.

International Search Report filed in PCT/US2012/047946.

International Search Report mailed Oct. 10, 2012, filed in PCT/US2012/047946.

\* cited by examiner

AVOCADO PITTING DEVICE

BACKGROUND

The preparation of an avocado for consumption typically begins with cutting the avocado substantially in half which leaves the pit exposed. The pit typically remains attached to one of the separated avocado halves. The avocado pit is removed. Next, the skin is removed and the fruit is then sliced for preparation and/or consumption. A sharp knife can be used to perform these tasks.

Another device currently used in avocado preparation includes a handle with lasso-like blade at one end that carves the pit from the fruit and a fan-like slicer attached to the other end of the handle. The slicer includes spaced apart blades for longitudinally slicing the fruit while also removing the fruit from the skin. This device is bulky. The lasso-like blade does not accommodate pits of different sizes and shapes, and during slicing, avocado residue, such as the fruit fiber, may become trapped in the spaces of the slicer. Cleaning the fiber out of these spaces can be difficult since cleaning devices may be too large to get in between the blades to remove the fibrous fruit.

BRIEF DESCRIPTION

An avocado pitting device includes a housing having an inner surface defining a recess. The recess is configured to receive a pit of an avocado. An engagement member projects inwardly from the housing inner surface. The engagement member is configured to engage the pit and retain the pit within the recess such that the pit is removable with the housing from the avocado.

Another example of an avocado pitting device includes a handle having a protuberance configured to at least partially receive a pit of an avocado. The handle has at least two spaced apart engagement members secured to and projecting from an inner surface of the protuberance. The engagement members are configured to engage the pit and retain the pit at least partially within the protuberance. A blade member is connected to the handle.

Yet another example of an avocado pitting device includes a handle having a first end portion and an opposite second end portion. A first blade member is coupled to the first end section of the handle. The first blade member is configured to cut open the avocado to expose a pit of an avocado. A second blade member is coupled to the second end portion of the handle. The second blade member is configured to slice the avocado. At least two spaced apart engagement members are interposed between the first and second blade members. The engagement members project outwardly from the handle and toward each other such that the engagement members define a space for receiving the avocado pit. The engagement members are configured to pierce the avocado pit and retain the avocado pit against the handle allowing the pit to be removed from the avocado.

DETAILED DESCRIPTION

It should, of course, be understood that the description and drawings herein are merely illustrative and that various modifications and changes can be made in the structures disclosed without departing from the scope of the appended claims. It will also be appreciated that the various identified components of the exemplary avocado pitting device disclosed herein are merely terms of art that may vary from one manufacturer to another and should not be deemed to limit the present disclosure.

Figure 1:
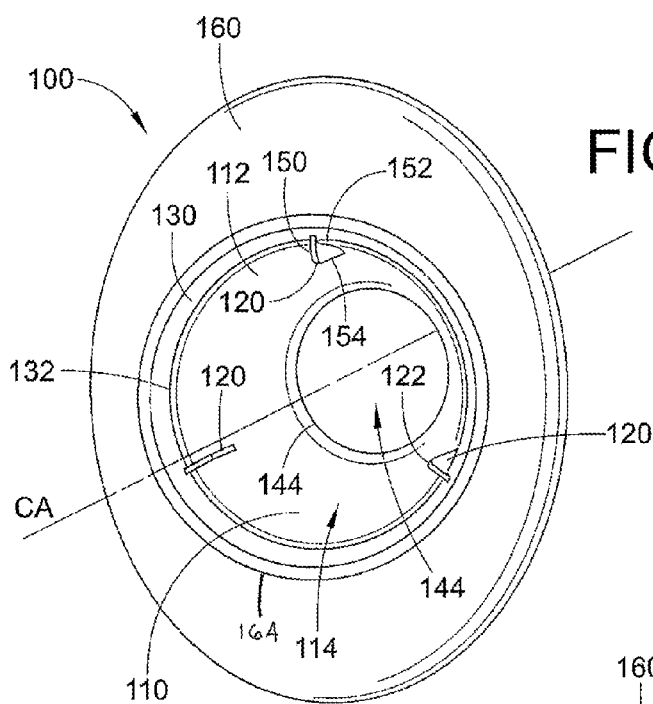
FIG. 1 is a bottom perspective view of an avocado pitting device according to one embodiment of the present disclosure.
Figure 2:
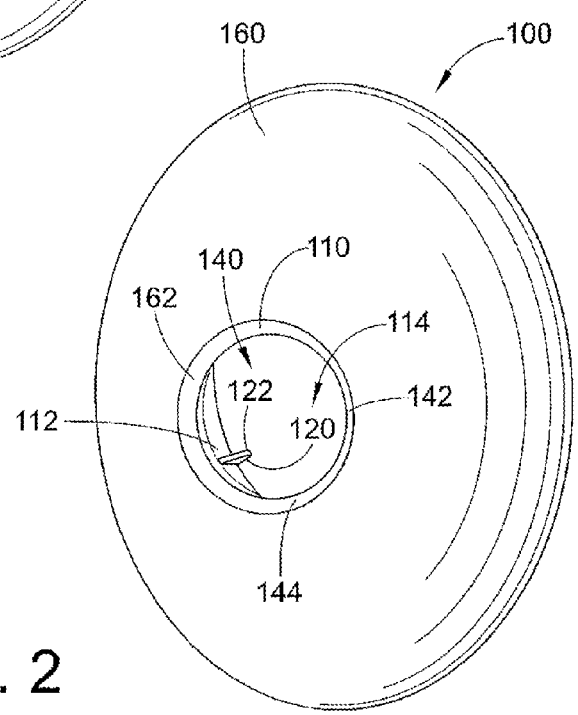
FIG. 2 is a top perspective view of the avocado pitting device of FIG. 1.

Referring now to the drawings, wherein like numerals refer to like parts throughout the several views, FIGS. 1 and 2 illustrate an avocado pitting device 100 according to one exemplary embodiment of the present disclosure. The device 100 is dimensioned to be grasped by an average-sized adult human's hand. The avocado pitting device 100 generally comprises a housing 110 having an inner surface 112 which defines a recess 114. The recess 114 is configured to at least partially receive a pit of an avocado. As will be discussed in greater detail below, at least one engagement member 120 is secured to and projects from the housing inner surface 112. The engagement member 120 is configured to engage an exterior surface of the avocado pit and retain the avocado pit at least partially within the recess 114 such that the pit is removable with the housing 110 from the avocado. In other words, when the housing 110 is moved away from the avocado, the pit is retained by the engagement member(s) 120 at least partially within the recess 114.

As shown in FIGS. 1 and 2, the housing 110 includes a bottom wall 130 having an opening 132 in communication with the recess 114. The opening 132 is sized to allow an avocado pit to pass therethrough and into the recess. As depicted, the opening 132 is circular in shape; although, this is not required. For example, the opening 132 can be polygonal in shape; the only requirement being that the overall dimensions of the opening allows avocado pits of varying sizes to pass therethrough. The housing 110 can further include a finger insert 140 in communication with the recess 114 and the opening 132. The finger insert 140 is positioned at a location on the housing above the at least one engagement member 120 located on the inner surface 112. This provides access to the exterior surface of the avocado pit and allows a user to remove the avocado pit from the recess 114 with minimal force exerted on the pit. In the depicted embodiment, the finger insert 140 is defined by an opening 142 provided on a top wall 144 of the housing 110. The top wall opening 142 is in communication with the recess 114 and can be smaller in size compared to the bottom wall opening 132. In the illustrated embodiment, and similar to the bottom wall opening 132, the top wall opening is circular in shape and has a diameter less than a diameter of the bottom wall opening. However, alternative shapes and sizes for the top wall opening 142, and, in turn, the finger insert 140 are contemplated. In the illustrated embodiment, the top wall opening 142 is coaxial with the bottom wall opening 132 which allows a user to firmly hold the pitting device 100 as the avocado pit is removed via the finger insert 140. It should also be appreciated that with a top wall opening 142, the pitting device 100 can be a dual-sided pitting device allowing a user to engage the avocado pit via insertion of the pit through the bottom wall opening 132 or through the top wall opening 142.

As indicated previously, the pitting device 100 includes the at least one engagement member 120 configured to engage the avocado pit and retain the pit at least partially within the recess 114 of the housing 110. For example, and according to one aspect, the engagement member 120 can be a barb adapted to penetrate the exterior surface of the avocado pit and attach the pit to the housing 110. In the depicted embodiment, the pitting device 100 includes at least two engagement members 120 angularly spaced on the housing inner surface 112 relative to a generally central axis CA defined by the recess 114. More particularly, the pitting device 100 includes at least three engagement members 120 which are equally angularly spaced from one another on the inner surface 112 relative to the central axis CA of the recess 114 and are aligned substantially parallel to the central axis. Thus, it should be appreciated that the present disclosure contemplates a pitting device 100 having a plurality of engagement members to dig into or pierce the exterior surface of the avocado pit and retain the pit to the pitting device 100. However, it should also be appreciated that the number or size of engagement members 112 projecting into the recess 114 should not restrict access to the recess 114. In other words, the number of engagement members 120 is such that the avocado pit easily enters the recess 114 while simultaneously being engaged by the engagement members 120.

As best depicted in FIG. 1, the engagement members 120 are positioned adjacent the bottom wall opening 132 and project toward a central axis defined by the opening, which is coaxial with the central axis CA. Each engagement member includes a pointed end 122 for piercing the avocado pit as the pit extends through the bottom wall opening 132 and enters the recess 114. Preferably, the pointed ends 122 of the engagement members do not extend downward below the bottom wall 130. The engagement members can have conforming shapes and sizes, or different shapes and sizes. In the illustrated embodiment, the engagement members 120 have similar substantially triangular shapes, each engagement member including a bottom surface 150, a side surface 152 and a top surface 154. The side surface 152 is secured to or in contact with the inner surface 112 of the housing 110. The top surface 154 slopes from the side surface 152 toward an end of the bottom surface 150, and an uppermost edge of each engagement member 120 is spaced from the top wall opening 142. The bottom surface 150 is substantially contiguous with the bottom wall 130 of the housing 110. With this arrangement, the engagement members 120 project toward each other such that the engagement members 120 together define a space for receiving the avocado pit. According to one aspect of the present disclosure, the engagement members 120 are integrally formed with the housing 110; although, this is not required. It should also be appreciated that the shape or profile of the engagement members 120 is not limited to the depicted triangular shape and that alternative shapes, sizes and configurations are contemplated, the only requirement being that the shape of the engagement members allows for piercing of the avocado pit and retention of the pit to the pitting device 100.

The avocado pitting device 100 can include a separate gripping member 160 which is secured to and substantially surrounds or encloses the housing 110. For example, the gripping member 160 can be connected to the housing 110 by overmolding, ultrasonic welding, by an adhesive, or by other known manners for attachment. The gripping member 160 is softer and more resilient than the housing 110 and, therefore, is configured to allow a user to easily handle the pitting device 100. The gripping member includes a first aperture 162 aligned with the top wall opening 142 such that the aperture at least partially defines the finger insert 140 and is in communication with the recess 114. The gripping member also includes a second aperture 164 aligned with the bottom wall opening 132. In the illustrated embodiment, the gripping member 160 is substantially dome-shaped; although, this is not required. Additionally, the inner surface 112 of the housing 110, and thus the recess 114, can be substantially dome-shaped which allows that housing to accommodate avocado pits of varying dimensions. As illustrated, the inner surface 112 defines a surface of revolution with respect to the central axis CA; however, this is not required. Alternatively, the inner surface 112 can have a profile, taken parallel with the central axis CA, which is polygonal in configuration.

It should be appreciated that the components of the avocado pitting device 100 (e.g. the housing 110, engagement members 120 and gripping member 160) can be manufactured from FDA-approved food contact materials. For example, the housing 110 and engagement members 120 can be formed from stainless steel, hardened plastic, ceramic or the like. The gripping member, which as indicated above is more resilient than the housing 110, can be formed from plastic and can have a surface finish adapted for improved traction, particularly in wet food preparation environments.

In use, the avocado is first cut substantially in half with a knife or other sharp implement. The pit typically remains attached to one of the separated avocado halves. The pitting device 100 is positioned over the avocado pit such that the bottom wall opening 132 is aligned with the pit. The pitting device 100 is then pressed onto the pit, which, in turn, forces the pit through the opening 132 and at least partially into the recess 114. As the pit enters the recess 114, the engagement members 120, which are at least partially located in the recess 114, engage the avocado pit by penetrating the exterior surface of the pit. Once engaged, the engagement members 120 retain the pit within the recess 114 such that the pit is removed with the pitting device 100 without mangling the fruit during removal. The skin is then removed and the fruit is then sliced for preparation and/or consumption.

With reference now to FIGS. 3-6, an avocado pitting device 200 according to another exemplary embodiment comprises a handle 202 having a housing or protuberance 210 connected thereto and configured to at least partially receive a pit of an avocado. The handle 202 has at least two spaced apart engagement members 220 secured to and projecting from an inner surface 212 of the protuberance 210. Similar to the device 100, the engagement members 220 are configured to engage the avocado pit and retain the pit at least partially within the protuberance 210. A resilient gripping member 260 is secured to and substantially surrounds or encloses a portion of the handle 202. The gripping member 260 allows a user to easily handle the pitting device 200. As will be discussed below, a blade member is connected to the handle 202 and configured to cut and/or slice the avocado.

The handle 202 includes a bottom wall 230 having an opening 232 in communication with an interior or recess 214 defined by the protuberance 210. The opening 232 is sized and shaped to allow avocado pits of varying sizes to pass therethrough and into the recess 214. As depicted, the opening 232 is circular in shape; although, this is not required. As shown, the recess 214 is substantially dome-shaped which allows for at least partial accommodation of avocado pits of varying sizes. The handle 202 further includes a finger insert 240 in communication with the recess 214. This provides access to the exterior surface of the avocado pit retained within the protuberance 210 and allows a user to remove the avocado pit from the device 200 with minimal force exerted on the pit. In the depicted embodiment, the finger insert 240 is defined by an opening 242 provided on a top wall 244 of the handle 202. The opening 142 is coaxial with the bottom wall opening 232 which allows a user to firmly hold the handle 202 and remove the avocado pit via the finger insert 240 with a single hand.

Figure 4:
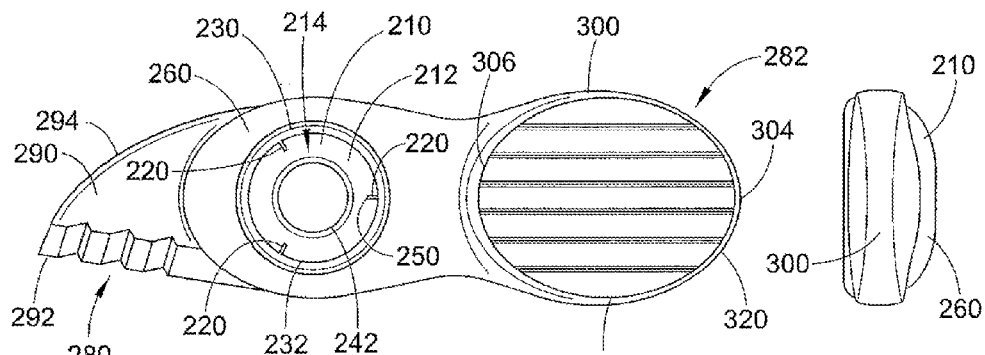
FIG. 4 is a bottom view of the avocado pitting device of FIG. 3.
Figure 6:
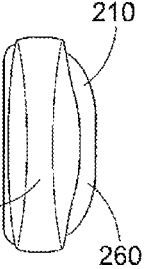
FIG. 6 is an end view of the avocado pitting device of FIG. 3 rotated 90° clockwise.
Figure 7:
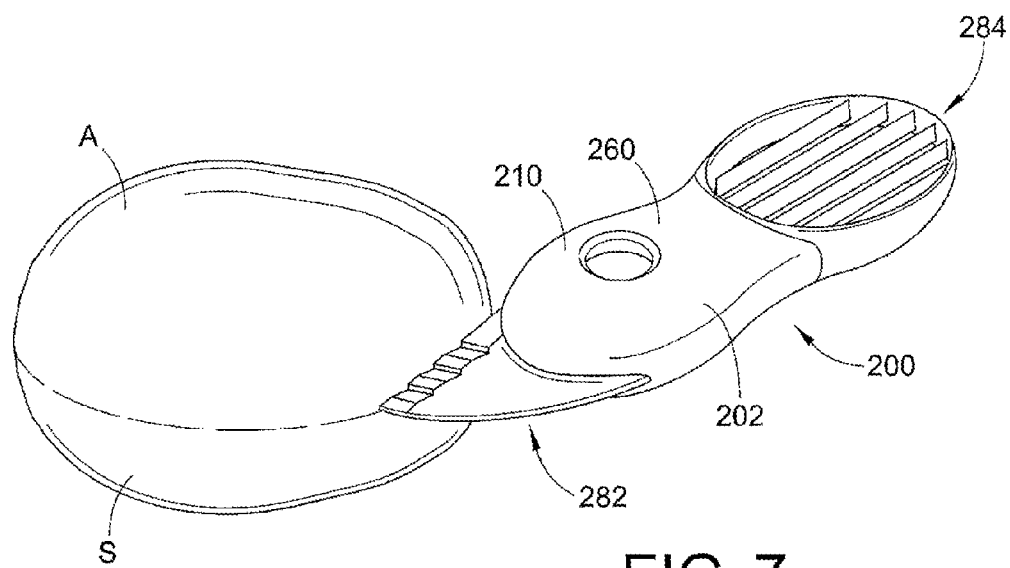
FIGS. 7 and 8 schematically depict the avocado pitting device of FIG. 3 cutting an avocado in half.
Figure 8:
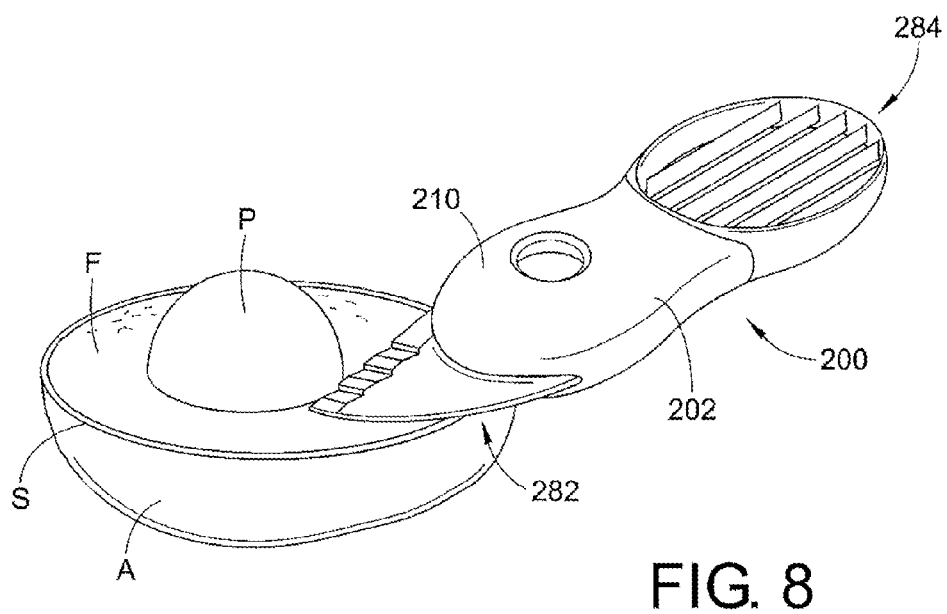
Figure 9:
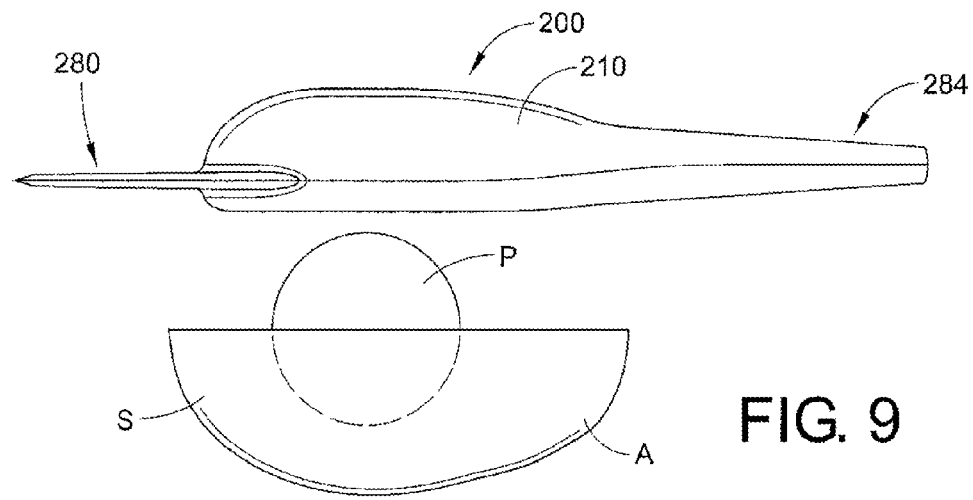
FIGS. 9-11 schematically depict the avocado pitting device of FIG. 3 removing a pit from the avocado.
Figure 10:
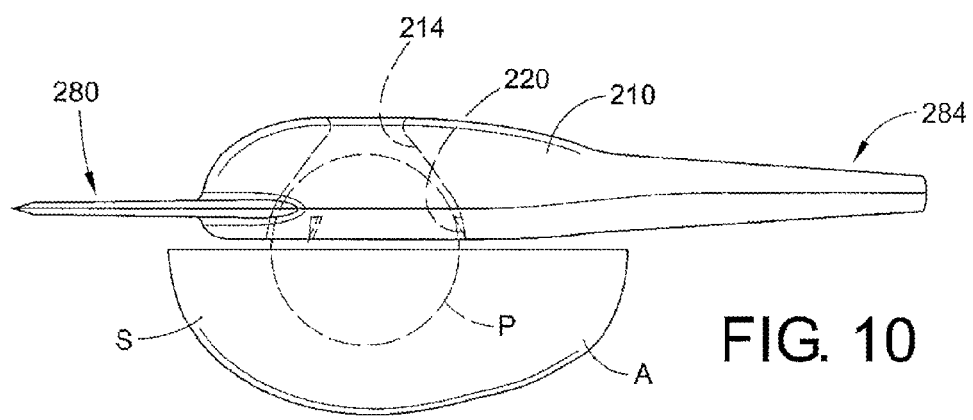
Figure 11:
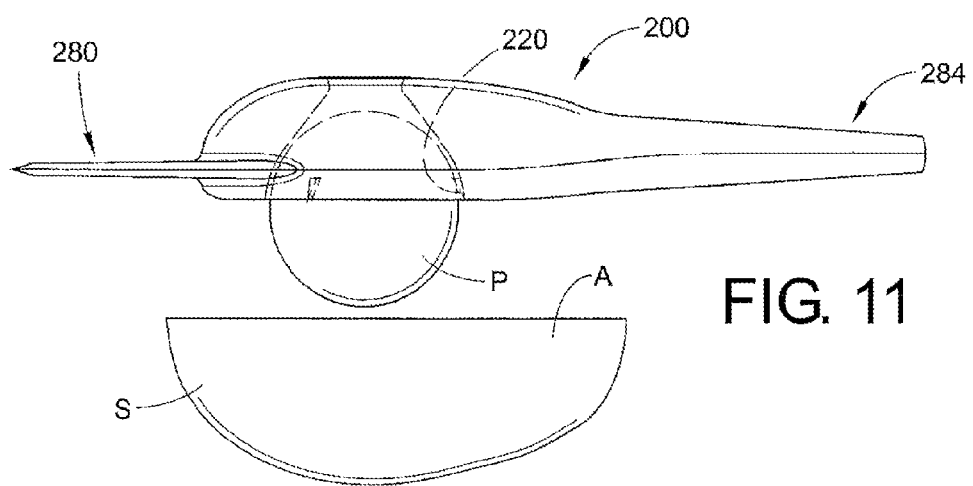
Figure 12:
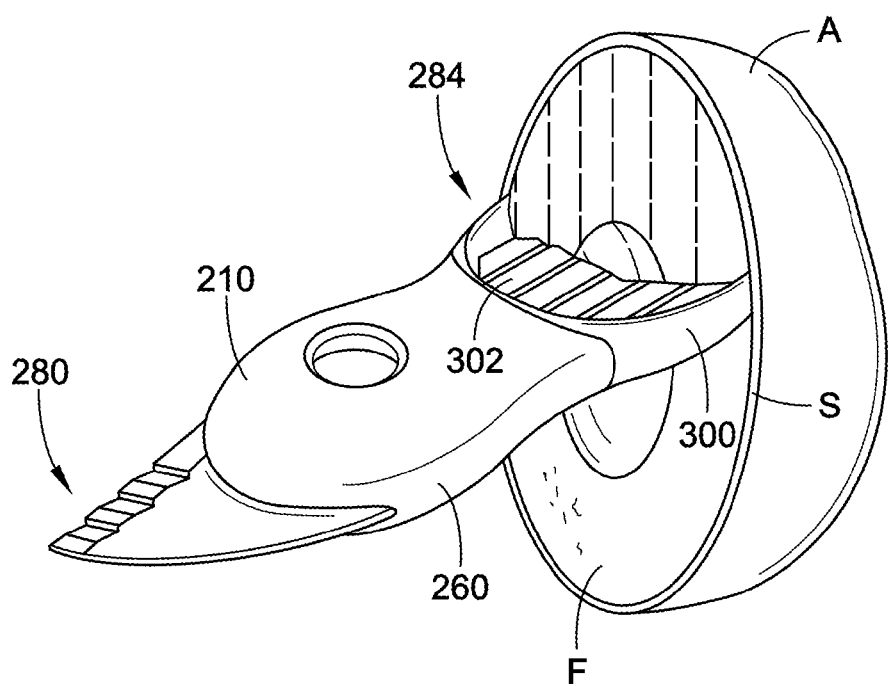
FIG. 12 schematically depicts the avocado pitting device of FIG. 3 removing the fruit from the avocado skin and slicing the fruit.

As indicated previously, the pitting device 200 can include at least two engagement members 220 circumferentially spaced on the inner surface 212. Again, as indicated above, more or less than two engagement members 220 are contemplated. More particularly, the pitting device 200 includes three engagement members 220 which are circumferentially spaced equally from one another on the inner surface 212. As best depicted in FIG. 4, the engagement members 220 are positioned adjacent the bottom wall opening 232 and project toward a central axis defined by the opening 232. Similar to engagement members 120 of the pitting device 100, each engagement member 220 can be substantially triangular shaped having a bottom surface 250 that is substantially contiguous with the bottom wall 230 of the handle 202; although, this is not required.

Figure 3:
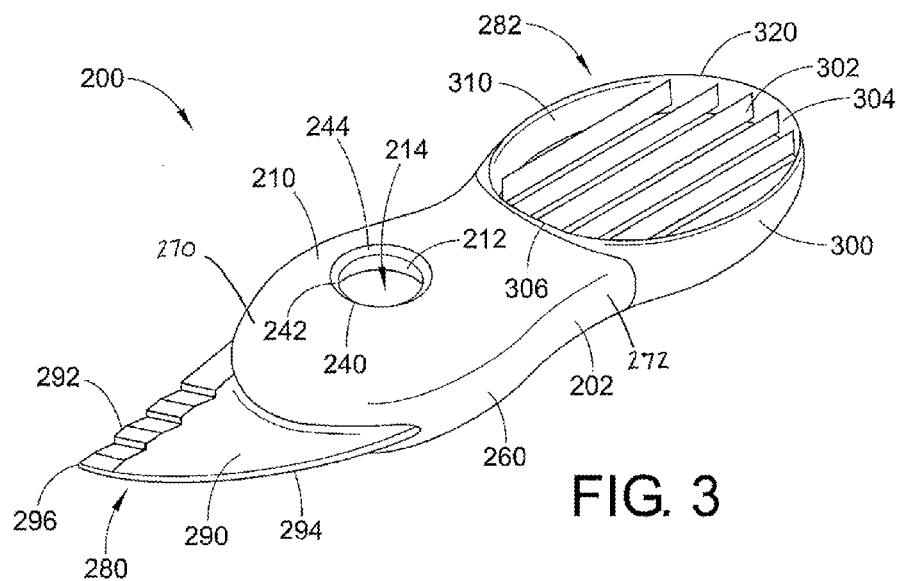
FIG. 3 is a top perspective view of an avocado pitting device according to another embodiment of the present disclosure.
Figure 5:
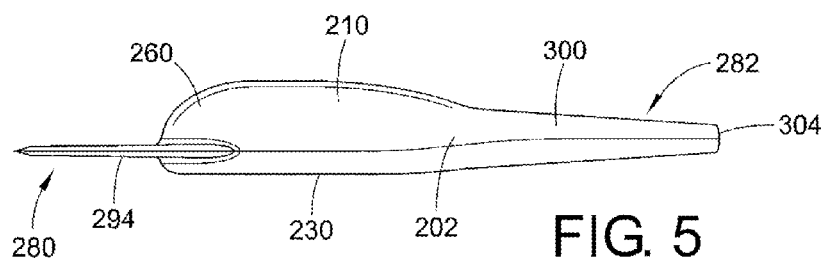
FIG. 5 is a side view of the avocado pitting device of FIG. 3.

With particular reference to FIGS. 3 and 4, the handle 202 has a first end portion 270 and an opposite second end portion 272, the protuberance 210 together with the engagement members 220 being interposed between the first and second end portions. At least one of the first and second end portions 270,272 has a blade member connected thereto. In the depicted exemplary embodiment, the blade member includes a first blade member or knife 280 and a second blade member or fan blade 282. The knife 280 is connected to and extends from the first end portion 270 of the handle 202. The knife is generally triangular in shape and includes a substantially planar body 290 having a first, relatively straight edge 292 and a second curved edge 294, the first and second edges converging to a pointed tip portion 296. The first edge 292 is configured to cut open the avocado to expose the pit, and in the depicted embodiment, the first edge 292 is at least partially serrated to provide a cutting surface suitable for breaking the skin of the avocado. The second edge 294 can be beveled or tapered to create an additional means for cutting for the avocado; although, this is not required. For example, the second edge 294 can be a dull edge of the knife 280. The tip portion 296 can be slightly curved to reduce the risk of cutting through the avocado skin while slicing the fruit therein.

The fan blade 284 is connected to and extends from the second end portion 272 of the handle 202. In the depicted embodiment, the fan blade 284 is configured to slice the avocado in substantially equal dimensions. Particularly, the fan blade 284 includes a frame 300 and slicing elements 302 extending from a proximal end 304 of the frame 300 to a distal end 306 of the frame. The frame 300 of the fan blade 284 is used to peel the skin from the avocado while the slicing elements 302 simultaneously slice the fruit. In the illustrated embodiment, the frame 300 is formed by a band 310 having a generally oval shape such that the frame takes the form of the avocado. At least one edge of the band 300 is beveled or tapered to create a sharpened edge 320 to facilitate peeling of the skin from the avocado. The sharpened edge 320 and the overall shape of the frame 300 facilitate positioning and movement of the frame 300 between the peel, or skin, and the fruit of the avocado, thus cutting the fibrous matter that holds the peel to the fruit.

The slicing elements 302 are generally evenly spaced apart from one another such that each slicing element 302 is substantially parallel to an adjacent slicing element 302. Even spacing of the slicing elements prevents build up of fruit residue and fiber at the proximal end 304 of the fan blade 284 and improves the ability to fully clean the fan blade. In the illustrated embodiment, the slicing elements 302 are formed by narrow ribbons that stretch across the frame 300. In the depicted embodiment, six slicing elements 302 are shown, although in other embodiments fewer or more slicing elements may be used. The slicing elements 302 can also be formed from a continuous wire which is strung back and forth across the frame 300, between the proximal end 304 and the distal end 306. Alternatively, the slicing elements 302 can be formed by a series of individual wires.

Similar to pitting device 100, the components of the avocado pitting device 200 (e.g. the handle 202, housing 210, engagement members 220, gripping member 260, and first and second blade members 280,282) can be manufactured from FDA-approved food contact materials. For example, the handle 202, engagement members 220 and first and second blade members 280,282 can be formed from stainless steel, hardened plastic, ceramic or the like. The gripping member 260 can be formed form a resilient plastic and can have a surface finish adapted for wet food preparation environments. The frame 46 can be formed from stainless steel, hardened plastic or the like. As shown, the components of the pitting device 200 are integrally formed to define a unitary avocado processing tool. However, it should be appreciated that the first and second blade members 280,282 can be separate members attached to the respective first and second end portions 270,272 of the handle 202.

In use, and with reference to FIGS. 7-12, the avocado A is first cut substantially in half with the first blade member 280. The pit P typically remains attached to one of the separated avocado halves H. The pitting device 200 is positioned over the avocado pit P such that the bottom wall opening 232 of the protuberance 210 is aligned with the pit P. The pitting device 200 is then pressed onto the pit, which, in turn, forces the pit through the opening 232 and at least partially into the recess 214. As the pit enters the recess 214, the engagement members 220 engage the avocado pit P by penetrating the exterior surface of the pit. Once engaged, the engagement members 220 retain the pit against the handle 202 within the recess 214 such that the pit is removed with the pitting device 200 without mangling the fruit during removal. The skin is then removed and the fruit is then sliced for preparation and/or consumption. To slice the avocado A, the sharpened edge 320 of the second blade member 384 is positioned between the avocado skin S and the fruit F. The second blade member 284 is pulled in an arc along the skin S such that the fruit F of the avocado A is sliced by the slicing elements 302 and the skin is cut away from the fruit by the sharpened edge 320 of the frame 300. The sliced fruit is pulled out of the skin by the slicing elements 302 and the skin falls away.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An avocado pitting device comprising:
   a housing having a substantially dome-shaped inner surface defining a recess, the inner surface extending continuously without interruption about a generally central axis of the recess, the recess configured to receive a pit of an avocado, and an engagement member projecting inwardly from the inner surface, the engagement member configured to engage the pit and retain the pit within the recess such that the pit is removable with the housing from the avocado, and further including a separate gripping member secured to and substantially enclosing an outer surface of the housing and configured for grasping by a human hand.

2. The avocado pitting device of claim 1, wherein pitting device includes at least two engagement members angularly spaced on the inner surface relative to the central axis of the recess.

3. The avocado pitting device of claim 2, wherein the pitting device includes at least three engagement members, the engagement members being angularly spaced from one another on the inner surface relative to the central axis of the recess.

4. The avocado pitting device of claim 3, wherein the engagement members point toward the central axis of the recess, the engagement members being equally angularly spaced and aligned substantially parallel to the central axis.

5. The avocado pitting device of claim 1, wherein the housing includes a bottom wall having a bottom wall opening in communication with the recess and sized to allow an avocado pit the pass therethrough, and a finger insert in communication with the recess for allowing a user to remove the avocado pit from the recess.

6. The avocado pitting device of claim 5, wherein the housing includes a top wall having a top wall opening in communication with the recess, the top wall opening defining the finger insert and having a diameter less than a diameter of the bottom wall opening.

7. The avocado pitting device of claim 5, wherein the engagement member includes a bottom surface substantially contiguous with the housing bottom wall and projecting into the opening.

8. The avocado pitting device of claim 1, wherein the gripping member is disposed over the recess and including an aperture in communication with the recess, the gripping member being softer and more resilient than the housing.

9. The avocado pitting device of claim 1, further including a handle having a first end portion and an opposite second end portion, at least one of the first and second end portions including a blade member connected thereto, the housing being secured to the handle and interposed between the first and second end portions.

10. The avocado pitting device of claim 9, wherein the blade member includes a knife connected to and extending from the first end portion of the handle and configured to cut open the avocado to expose the pit, and a fan blade connected to and extending from the second end portion of the handle and configured to slice the avocado.

11. An avocado pitting device comprising:
    a handle having a protuberance defining a substantially dome-shaped recess configured to at least partially receive a pit of an avocado, the handle having at least two spaced apart engagement members secured to and projecting from an inner surface of the protuberance, the engagement members configured to engage the pit and retain the pit at least partially within the protuberance;
    the handle further includes a bottom wall having a bottom wall opening in communication with the recess, and a finger insert defined by an opening in communication with the recess which allows a user to remove the avocado pit from the recess, the finger insert opening being coaxial with the bottom wall opening;
    a blade member connected to the handle; and
    a resilient gripping member connected to the handle, the gripping member enclosing an outer surface of the protuberance.

12. The avocado pitting device of claim 11, wherein the finger insert is provided on the protuberance and the finger insert opening is sized smaller than the opening of the bottom wall.

13. The avocado pitting device of claim 11, wherein the at least two engagement members includes a plurality of engagement members positioned adjacent the bottom wall opening such that the at least two engagement members pierce the avocado pit as the pit extends through the bottom wall opening and enters the recess, each engagement member including an end which projects toward a central axis defined by the opening.

14. The avocado pitting device of claim 13, wherein each engagement member is substantially triangular shaped, and generally aligned with a central axis of the bottom wall opening.

15. The avocado pitting device of claim 11, wherein the handle includes a first end portion and an opposite second end portion, the first end portion including a first blade member configured to cut open the avocado to expose the pit and the second end portion including a second blade member configured to slice the avocado.

16. An avocado pitting device comprising:
    a handle having a first end portion and an opposite second end portion;
    a first blade member coupled to the first end section of the handle, the first blade member configured to cut open the avocado to expose a pit of an avocado;
    a second blade member coupled to the second end portion of the handle, the second blade member configured to slice the avocado; and
    at least two spaced apart engagement members interposed between the first and second blade members, the engagement members projecting outwardly from the handle and toward each other such that the engagement members define a space for receiving the avocado pit, the engagement members being configured to pierce the avocado pit and retain the avocado pit against the handle allowing the pit to be removed from the avocado.

17. The avocado pitting device of claim 16, wherein the handle defines a substantially dome-shaped recess sized to at least partially receive the avocado pit, the at least two engagement members being positioned within the recess.

18. The avocado pitting device of claim 17, wherein the handle includes a finger insert in communication with the recess for allowing a user to remove the avocado pit from the recess.

19. An avocado pitting device comprising:
    a handle having an inner surface defining a recess configured to at least partially receive a pit of an avocado, the handle having at least two spaced apart engagement members secured to and projecting from the inner surface, the engagement members configured to engage the pit and retain the pit at least partially within the recess;

the handle further includes a bottom wall having a bottom wall opening in communication with the recess, and a top wall configured to at least partially cover the recess; and a finger insert located on the top wall, the finger insert being in communication with the recess which allows a user to remove the avocado pit from the recess.

\* \* \* \* \*